United States Patent
Lim et al.

(10) Patent No.: US 12,033,276 B2
(45) Date of Patent: *Jul. 9, 2024

(54) LEARNING-BASED 3D MODEL CREATION APPARATUS AND METHOD

(71) Applicant: Electronics and Telecommunications Research Institute, Daejeon (KR)

(72) Inventors: Seong-Jae Lim, Daejeon (KR); Tae-Joon Kim, Sejong-si (KR); Seung-Uk Yoon, Daejeon (KR); Seung-Wook Lee, Daejeon (KR); Bon-Woo Hwang, Daejeon (KR); Jin-Sung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

This patent is subject to a terminal disclaimer.

(21) Appl. No.: 17/550,606

(22) Filed: Dec. 14, 2021

(65) Prior Publication Data

US 2022/0101604 A1 Mar. 31, 2022

Related U.S. Application Data

(63) Continuation of application No. 16/752,260, filed on Jan. 24, 2020, now Pat. No. 11,232,632.

(30) Foreign Application Priority Data

Feb. 21, 2019 (KR) .................. 10-2019-0020296

(51) Int. Cl.
*G06F 18/214* (2023.01)
*G06T 15/04* (2011.01)
(Continued)

(52) U.S. Cl.
CPC .......... *G06T 17/00* (2013.01); *G06F 18/2155* (2023.01); *G06T 15/04* (2013.01);
(Continued)

(58) Field of Classification Search
CPC .......... G06T 15/04; G06T 17/20; G06T 17/00; G06F 18/2155
See application file for complete search history.

(56) References Cited

U.S. PATENT DOCUMENTS 5,274,551 A  12/1993 Corby, Jr.
8,270,704 B2  9/2012 Kim et al.
(Continued)

FOREIGN PATENT DOCUMENTS

KR  1020090064154 A  6/2009
KR  1020110062083 A  6/2011
(Continued)

OTHER PUBLICATIONS

Machine translated KR101836882, Date Published: Mar. 9, 2018. (Year: 2018).*
(Continued)

*Primary Examiner* — Sing-Wai Wu
(74) *Attorney, Agent, or Firm* — Sughrue Mion, PLLC

(57) ABSTRACT

Disclosed herein are a learning-based three-dimensional (3D) model creation apparatus and method. A method for operating a learning-based 3D model creation apparatus includes generating multi-view feature images using supervised learning, creating a three-dimensional (3D) mesh model using a point cloud corresponding to the multi-view feature images and a feature image representing internal shape information, generating a texture map by projecting the 3D mesh model into three viewpoint images that are input, and creating a 3D model using the texture map.

9 Claims, 5 Drawing Sheets

(51) Int. Cl.
    *G06T 17/00*         (2006.01)
    *G06T 17/20*         (2006.01)
    *G06V 10/10*         (2022.01)
    *G06V 10/20*         (2022.01)
    *G06V 10/40*         (2022.01)
    *G06V 10/54*         (2022.01)
    *G06V 10/774*       (2022.01)
    *G06V 10/776*       (2022.01)

(52) U.S. Cl.
    CPC .............. *G06T 17/20* (2013.01); *G06V 10/10* (2022.01); *G06V 10/255* (2022.01); *G06V 10/40* (2022.01); *G06V 10/54* (2022.01); *G06V 10/7753* (2022.01); *G06V 10/776* (2022.01)

(56) References Cited

U.S. PATENT DOCUMENTS

| 2009/0154794 | A1 | 6/2009 | Kim et al. |
| 2011/0128286 | A1 | 6/2011 | Park et al. |
| 2013/0089247 | A1 | 4/2013 | Mercuriev |
| 2014/0118402 | A1 | 5/2014 | Gallo et al. |
| 2014/0132604 | A1 | 5/2014 | Bao et al. |
| 2016/0100154 | A1 | 4/2016 | Ghyme |
| 2016/0364905 | A1 | 12/2016 | Jung et al. |
| 2019/0026954 | A1 | 1/2019 | Vats |
| 2019/0138786 | A1 | 5/2019 | Trenholm et al. |

FOREIGN PATENT DOCUMENTS

| KR | 101673442 B1 | 11/2016 |
| KR | 1020180017916 A | 2/2018 |
| KR | 1020180065860 A | 6/2018 |
| KR | 1020180108709 A | 10/2018 |
| WO | 2016090475 A1 | 6/2016 |

OTHER PUBLICATIONS

Zeng Huang et al., Deep Volumetric Video From Very Sparse Multi-View Performance Capture, ECCV 2018 Paper, Oct. 2018.

* cited by examiner

LEARNING-BASED 3D MODEL CREATION APPARATUS AND METHOD

CROSS REFERENCE TO RELATED APPLICATION

This application is a continuation application of U.S. patent application Ser. No. 16/752,260, filed on Jan. 24, 2020, and claims the benefit of Korean Patent Application No. 10-2019-0020296, filed Feb. 21, 2019, which is hereby incorporated by reference in its entirety into this application.

BACKGROUND OF THE INVENTION

1. Technical Field

The present invention relates to a learning-based three-dimensional (3D) model creation apparatus and method.

2. Description of the Related Art

Generally, in order to implement 3D modeling of an object in an image, 3D models having various characters may be collected, created and constructed into a database (DB), so that sketch/depth/normal images corresponding to various viewpoints of each 3D model are projected, created and constructed into a DB, and depth/normal images corresponding to various viewpoints corresponding to an input sketch image are generated through supervised learning, and thus 3D information is generated using camera calibration parameters that are used in the generation of learning data. This method is limited in that it creates only a monochrome 3D model having a very rough form, depending on the resolution or details of the input sketch image, and in that the internal shapes of a character hidden by clothes, accessories, hair, or the like and concave regions cannot be reconstructed and only clearly apparent convex regions are reconstructed/generated. Also, since an input sketch image is a monochrome image, a reconstructed 3D model inevitably becomes a monochrome model. Technology for reconstructing details, such as the face, hands, and hair of a 3D model, and reconstructing internal character shapes and colors hidden by clothes, accessories, hair, etc. is required.

PRIOR ART DOCUMENTS

Patent Documents (Patent Document 1) U.S. Patent Application Publication no. US 2014/0132604, Date of Publication: May 15, 2014, Title: Semantic Dense 3D Reconstruction (Patent Document 2) Korean Patent Application Publication No. 10-2018-0065860, Date of Publication: Jun. 18, 2018, Title: Apparatus and Method for Generating 3D Face Model (Patent Document 3) Korean Patent Application Publication No. 10-2018-0108709, Date of Publication: Oct. 4, 2018, Title: Virtually Trying Clothes Realistic Body Model of User Virtually Trying Clothes on Realistic Body Model of User

SUMMARY OF THE INVENTION

Accordingly, the present invention has been made keeping in mind the above problems occurring in the prior art, and an object of the present invention is to provide a learning-based 3D model creation method and apparatus, which can automatically create a 3D character model that realistically represents a character object in an image/original picture/video, and can immediately apply the 3D character model to a game/animation fields without requiring a manual operation on the part of a user.

Another object of the present invention is to provide a learning-based 3D model creation method and apparatus, which define and train semantic correlations between objects and background objects constituting a scene in an image/video, and also define and train semantic hierarchical relationships between detailed objects in each object, thus accurately detecting and recognizing even detailed objects in a background included in an input image and enabling the semantic analysis of each scene in the image.

A further object of the present invention is to provide an apparatus and method for creating a 3D model, which detect errors in a constructed learning DB-based learning algorithm, and then correct the learning DB and extend the DB with new data.

In accordance with an aspect of the present invention to accomplish the above objects, there is provided a method for operating a learning-based 3D model creation apparatus, including generating multi-view feature images using supervised learning, creating a three-dimensional (3D) mesh model using a point cloud corresponding to the multi-view feature images and a feature image representing internal shape information, generating a texture map by projecting the 3D mesh model into three viewpoint images that are input, and creating a 3D model using the texture map.

Generating the multi-view feature images may include receiving the three viewpoint images corresponding to a front view, a side view, and a rear view, and collecting data about each character model for learning.

Generating the multi-view feature images may further include generating multi-view images by projecting the character model in respective camera viewpoints.

The supervised learning may be separately performed by dividing cameras into a global camera group and a local camera group.

The global camera group and the local camera group may be configured such that a learning parameter of the global camera group and a learning parameter of the local camera group are different from each other.

Creating the 3D mesh model may include representing the multi-view feature images by the point cloud in a 3D space through a multi-view image-based 3D reconstruction algorithm, and creating the 3D mesh model by correcting the point cloud using a result value obtained from an X-ray network.

The X-ray network may generate the feature image that represents internal shape information of a reconstruction target object by receiving, as an input, a specific feature image in a specific viewpoint, among the multi-view feature images.

Generating the texture map may include acquiring pieces of texture information for respective polygons with respect to the three viewpoint images, and generating a color of an area that is incapable of being acquired from the three viewpoint images by performing color transfer on the acquired texture information.

In accordance with another aspect of the present invention to accomplish the above objects, there is provided a learning-based 3D model creation apparatus, including at least one processor, and a memory for storing at least one instruction executed by the at least one processor, wherein the at least one instruction is configured to generate a multi-view feature image using supervised learning, create a three-dimensional (3D) mesh model using a point cloud corresponding to the multi-view feature image and a feature image representing internal shape information, generate a texture map by projecting the 3D mesh model into three viewpoint images that are input, and create a 3D model using the texture map.

The supervised learning may be performed depending on an array of a global camera group and a local camera group.

Respective camera parameters of the global camera group and the local camera group may be configured such that a distance between each camera and an object and near and far parameter values of a viewing frustum are differently set.

The supervised learning may be performed by rendering a multi-view feature image of a 3D model from which an outermost layer is removed through the global camera group, the outermost layer being defined by clothes or accessories of a 3D object, collected in a database (DB) by receiving, as an input, a specific feature image in a specific viewpoint, among the multi-view feature images.

The multi-view feature image for an internal shape other than the outermost layer may be generated by receiving depth and X-ray images using a learning parameter obtained through supervised learning.

The feature image may be configured such that information about an internal shape represented by the feature image is generated in a form of an internal shape multi-view multi-feature image through supervised learning with both pieces of internal shape information and an internal shape mesh model, from which an outermost shape mesh collected in the DB is removed, and the internal shape multi-view multi-feature image may undergo a point cloud representation procedure and a meshing procedure, and thus a final 3D mesh model having internal/external shape meshes may be created.

BRIEF DESCRIPTION OF THE DRAWINGS

The accompanying drawings are provided to help the understanding of the present embodiments, and the embodiments are provided together with the detailed descriptions thereof. However, the technical features of the present embodiments are not limited to what is specifically shown in the drawings, and the features disclosed in respective drawings may be combined to configure new embodiments.

DESCRIPTION OF THE PREFERRED EMBODIMENTS

Figure 1:
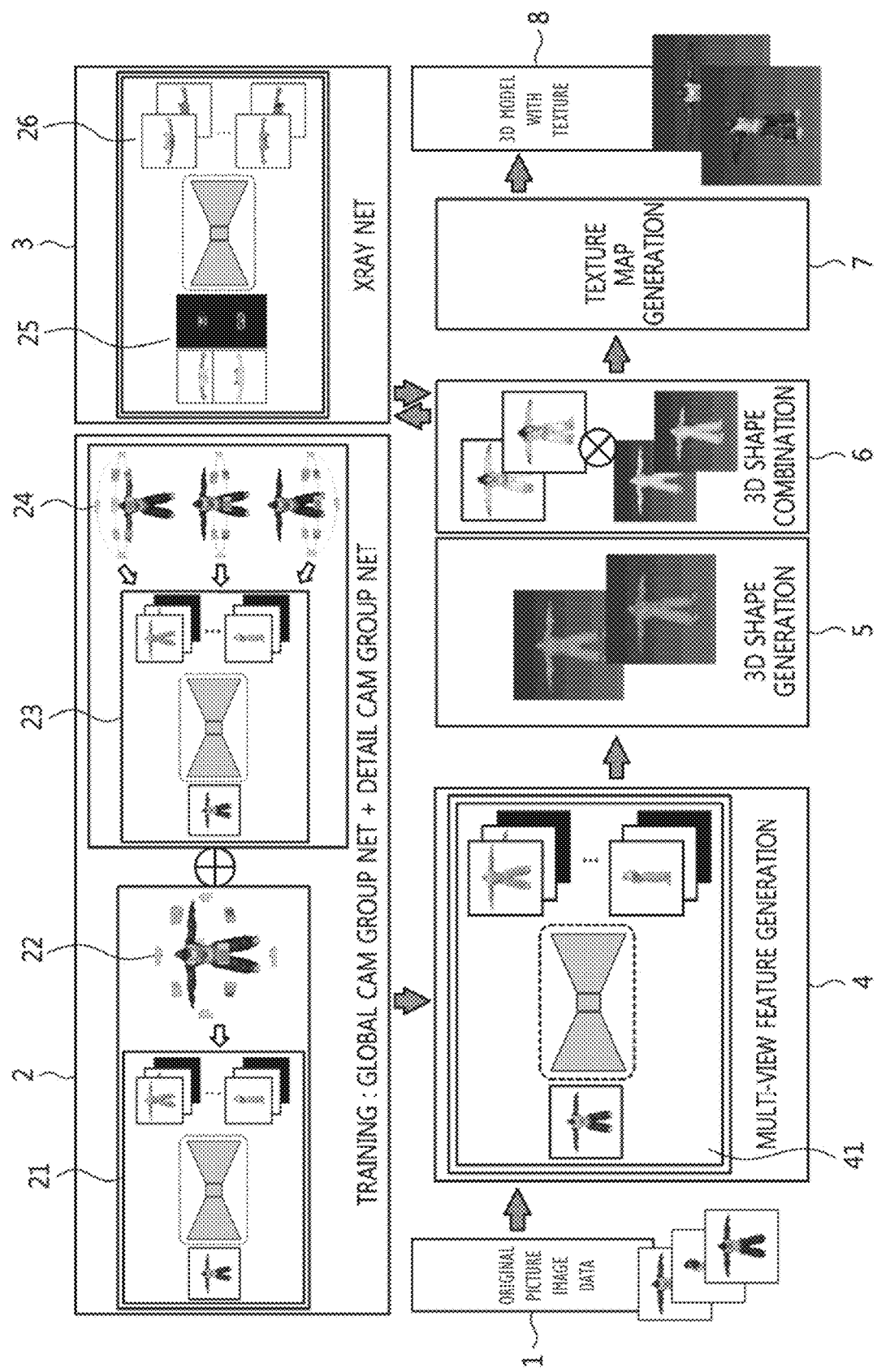
FIG. 1 is a diagram exemplarily illustrating a process for generating learning data in a learning-based 3D model creation apparatus according to an embodiment of the present invention.

Embodiments of the present invention are described with reference to the accompanying drawings in order to describe the present invention in detail so that those having ordinary knowledge in the technical field to which the present invention pertains can easily practice the present invention.

Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It will be understood that, although the terms "first" and "second" may be used herein to describe various elements, these elements should not be limited by these terms. These terms are only used to distinguish one element from another element. For instance, a first element discussed below could be termed a second element without departing from the teachings of the present invention. Similarly, a second element could also be termed a first element. It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting. In the present invention, the singular forms are intended to include the plural forms as well, unless the context clearly indicates otherwise. It should be further understood that the terms "comprise", "include", and "have", when used in this specification, specify the presence of stated features, integers, steps, operations, elements, components, and/or combinations thereof, but do not preclude the presence or addition of one or more other features, integers, steps, operations, elements, components, and/or combinations thereof. Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

A learning-based 3D model creation apparatus and method according to an embodiment of the present invention may roughly reconstruct even the internal shape of a two-dimensional (2D) object in an input image by automatically creating a 3D model identical to the 2D object in the input image.

FIG. 1 is a diagram exemplarily illustrating a process in which the learning-based 3D model creation apparatus according to an embodiment of the present invention generates learning data. Referring to FIG. 1, for input images/original pictures 1, three viewpoint images for a front view, a side view, and a rear view may be input. At this time, learning data required for learning may be generated using the following procedure.

In an embodiment, when a modeling target is a character model, 3D character model data may be collected. In an embodiment, virtual cameras may be spherically arranged around each 3D character model (i.e., a global camera group 22).

In an embodiment, a central 3D model is projected from the viewpoints of respective cameras, and thus multi-view images may be generated. In this case, projection is performed using a diffuse shader, a depth shader, a normal shader, an x-ray shader or the like for projection, and thus a multi-view diffuse map, depth map, normal map, or x-ray map may be generated.

Also, respective virtual camera groups for a hemispheric upper part, a hemispheric lower part, and a circular middle part may be formed and arranged around the 3D model, as indicated by '24'. Pieces of model information based on the upper part, the lower part, and the middle part of the 3D model may be more precisely projected by adjusting projection parameters for respective camera groups, unlike the global camera group. The camera projection parameters used here may include a perspective projection parameter, an orthographic projection parameter, a distance between the 3D model and each camera, near and far (distance) parameters of a viewing frustum, etc.

In an embodiment, projection images may be generated by applying projected multi-feature images (e.g., a diffuse image, a depth image, a normal image, an x-ray image, etc.) to all collected 3D character models. By applying a supervised learning network to such learning data, learning may be performed so that, when an input indicates only three viewpoints (e.g., a front view, a side surface, and a rear view), various multi-view feature images may be generated (2). Such supervised learning may be separately conducted by dividing camera groups into a global camera group 21 and local camera groups 23, and thus the learning parameters may be differently set.

In an embodiment, an inference process 4 for generating multi-view multi-feature images may generate multi-view multi-feature images corresponding to three viewpoints of the input original picture by applying learning parameters determined via the learning process (41). The multi-view multi-feature images generated in this way may be represented by a point cloud (5) in a 3D space through a multi-view image-based 3D reconstruction algorithm.

The point cloud generated in this way may be corrected with results obtained using an X-ray network (X-ray Net) (3), and then a final 3D mesh model may be created (6). In an embodiment, point cloud generation (5) may include the generation of a global point cloud reconstructed based on multi-view multi-feature images generated through a global camera group network (net) and the generation of a local point cloud reconstructed based on multi-view multi-feature images generated through a local camera group net.

In an embodiment, by means of combination and replacement methods in each camera parameter-based 3D space, the global point cloud may take the entire shape of a 3D object, and the local point cloud may function to reconstruct shapes by bringing out the details of a head, nose, sleeves, and clothes. In this case, the combination and replacement methods may join the global point cloud and the local point cloud together. In an embodiment, a final 3D point cloud may be generated using a scheme for replacing a non-detailed part of the global point cloud, among point clouds in a 3D space related to a main representation area, based on central points of respective camera groups in the local point cloud.

In an embodiment, the X-ray network (Net) may generate a feature image (depth) representing the internal shape information of a reconstruction target object by receiving, as an input, a feature image (e.g., a depth or X-ray image) in a specific viewpoint (upper or lower viewpoint), among multi-view multi-feature images. This means that the final 3D mesh model having internal/external shape information may be created through a combination with the reconstructed point cloud.

In an embodiment, the final 3D mesh model 6 may combine the generated dense point clouds with an internal point cloud generated based on the internal shape information generated through the X-ray Net (3). In an embodiment, the final 3D mesh model may be created through a meshing algorithm of the point cloud, such as Poisson reconstruction.

In an embodiment, the 3D mesh model created in this way is projected in three viewpoints of the input original picture, and pieces of texture information for respective polygons may be acquired, and thus a texture map may be generated (7). At this time, colors of areas (e.g., an upper part, a lower part, etc.) that cannot be acquired in three viewpoints of the original picture may be generated by performing color transfer on the acquired colors.

In an embodiment, the 3D shape and the texture map may be finally generated, and thus a final 3D model may be created (8).

The configuration of the multi-view multi-feature image generation network illustrated in FIG. 1 is implemented as an encoding and decoding structure composed of multiple convolution layers and multiple rectified linear unit (ReLU) activation functions, and may implement a cost function through multiple convolutional layers having fully connected layers of respective feature images so as to improve the quality of generated images.

Figure 2:
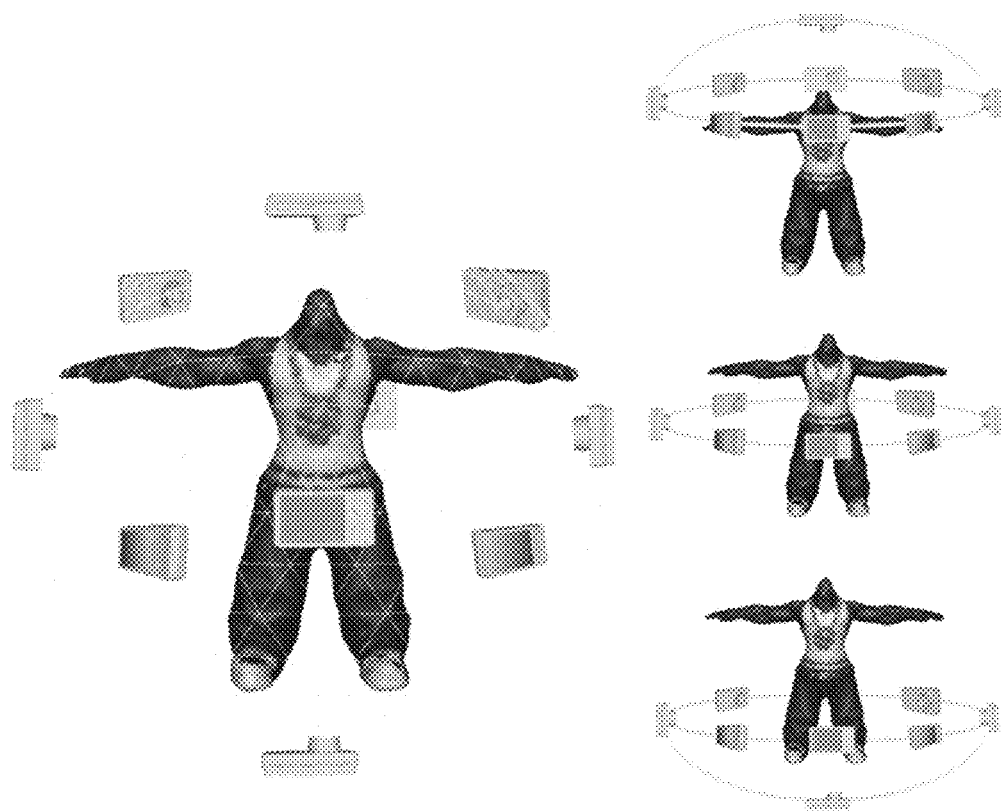
FIG. 2 is a diagram exemplarily illustrating camera arrays in a global camera group and local camera groups.

FIG. 2 is a diagram exemplarily illustrating a camera array of a global camera group and local camera groups. Referring to FIG. 2, camera parameters of the global camera group and camera parameters of the local camera groups may be designated such that the values of the distances between cameras and an object, the near and far parameter values of a viewing frustum, etc. are differently set.

In an embodiment, since the global camera group is intended to reconstruct the entire shape of a 3D object, and the local camera groups are intended to reconstruct the detailed shapes of respective partial areas corresponding to the upper part, the lower part, and the middle part, the local camera groups may be arranged such that the cameras therein are closer to each other than those in the global camera group. Also, pieces of depth information for respective shapes may be subdivided so as to represent the detailed shapes of the 3D object by reducing the difference between the near and far parameter values.

In an embodiment, learning may be conducted by arranging cameras in the local camera groups so that the center of a head area is set to the center of an upper part group, a navel area is set to the center of a middle part group, and an ankle area is set to the center of a lower part group through the analysis of objects in the input original picture/image. In this case, object analysis may be performed using an object detection, partitioning, and recognition algorithm.

Figure 3:
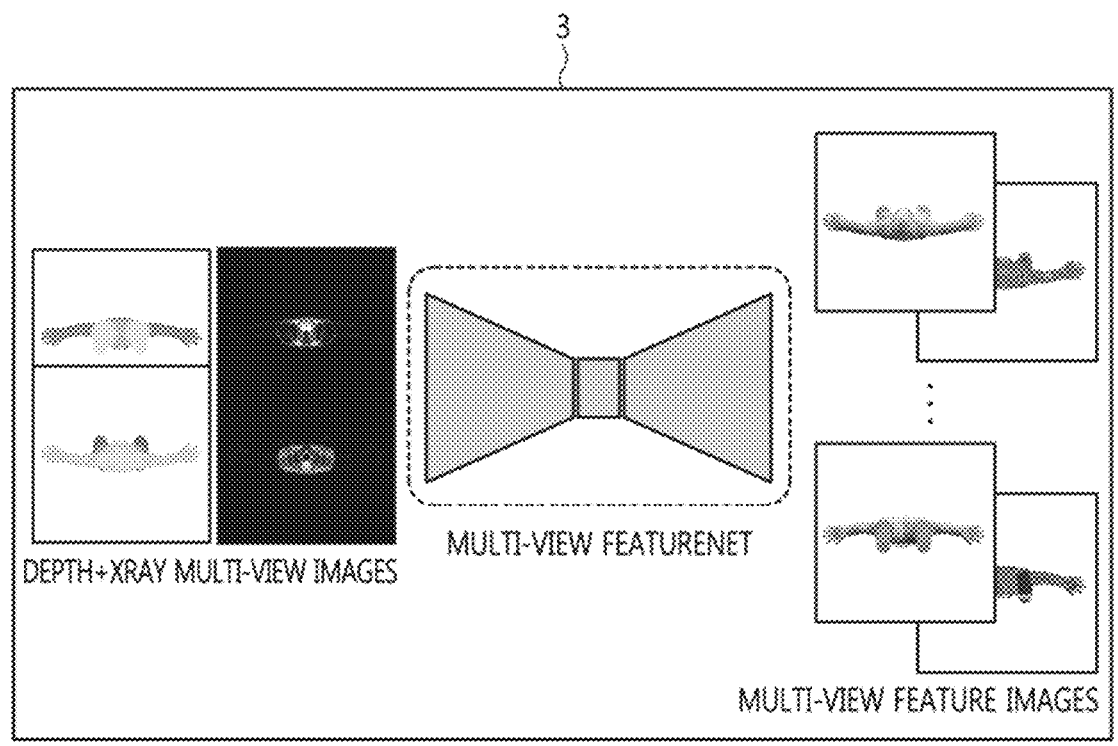
FIG. 3 is a diagram exemplarily illustrating a learning network for reconstructing the internal shape of a 3D model.

FIG. 3 is a diagram exemplarily illustrating a learning network for reconstructing the internal shape of a 3D model. Referring to FIG. 3, an existing multi-view image-based point cloud reconstruction method is limited in that only the external shape of a 3D object is reconstructed, whereas the learning technique according to the embodiment of the present invention may overcome this limitation.

As illustrated in FIG. 1, among multi-view feature images generated through an inference procedure 4 for the generation of multi-view multi-feature images, a multi-view feature image of a 3D model, in which one outermost layer defined by clothes or accessories of the 3D object collected in the DB by receiving, as an input, a specific feature image (depth or X-ray) in a specific viewpoint (upper or lower viewpoint) is removed, may be generated to be rendered by the global camera group, and may then be learned via a supervised learning technique. A multi-view feature image for the internal shape of the 3D model, other than the outermost layer, may be generated by receiving the depth and X-ray images through the use of learning parameters learned in this way. The multi-view feature image generated in this way may be reconstructed into a point cloud through the multi-view image-based 3D reconstruction technique. A 3D point cloud having internal/external shapes may be reconstructed through combination with the point cloud reconstructed in (5) of FIG. 1.

Figure 4:
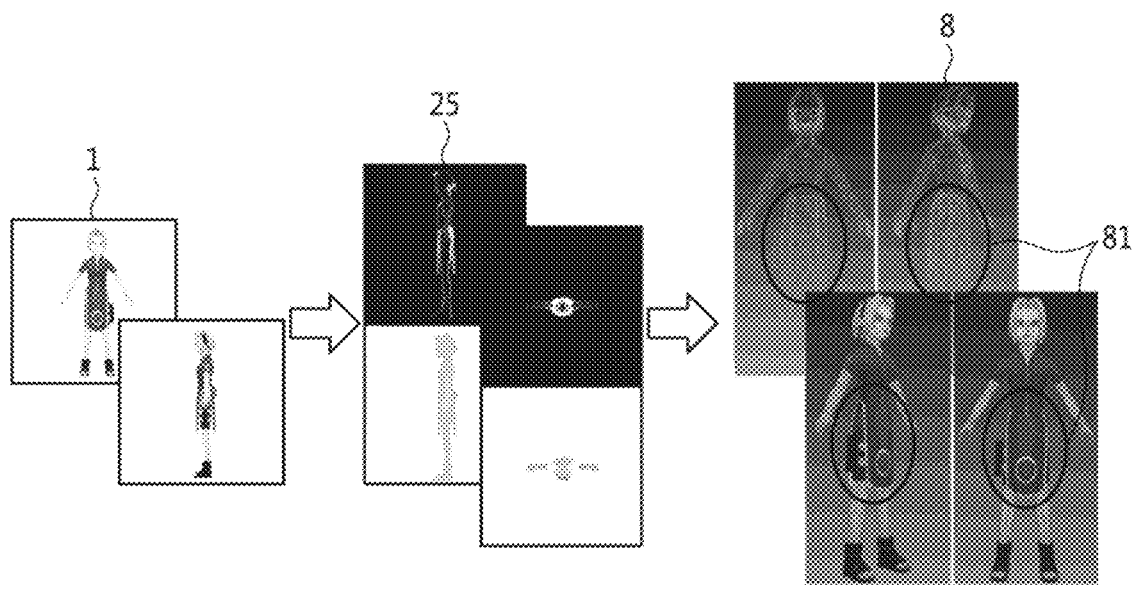
FIG. 4 is a diagram illustrating an example of a created 3D mesh model having internal/external shapes and an input original picture/image.

FIG. 4 is a diagram exemplarily illustrating an example of a created 3D mesh model 8 having internal/external shapes and an input original picture/image 1. Referring to FIG. 4, a specific feature image (depth or X-ray image) 25 in a specific viewpoint of the input original picture may contain information about the internal/external shapes of a 3D object that is a reconstruction target.

In an embodiment, the image 25 in the viewpoint facing the upper part from the lower part of the depth or X-ray image may indicate depth information at which an internal shape inside the outermost shape is present, and feature images in a side viewpoint and a front viewpoint may also represent the internal shape. By means of supervised learning of the pieces of internal shape information represented in this way and an internal shape mesh model from which the outermost shape mesh collected in the DB is removed, the feature image, such as that in (25), may be generated in such a way that information indicating which internal shape is represented may be generated in the form of an internal-shape multi-view multi-feature image. This shows that a final 3D mesh model having the internal/external shape meshes such as those in (8) through a procedure for representing a point cloud and a meshing procedure may be created.

Figure 5:
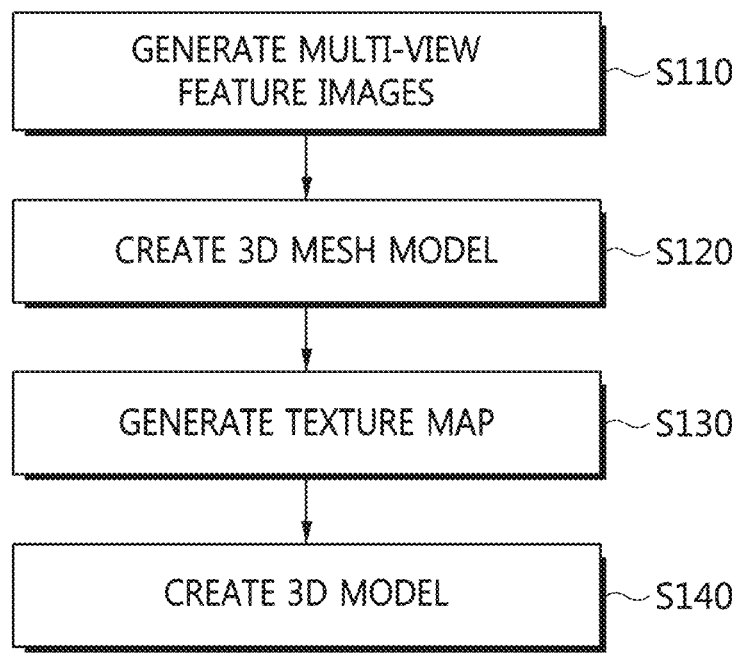
FIG. 5 is a flowchart exemplarily illustrating a method for operating a learning-based 3D model creation apparatus according to an embodiment of the present invention.

FIG. 5 is a flowchart exemplarily illustrating a method for operating a learning-based 3D model creation apparatus according to an embodiment of the present invention. Referring to FIGS. 1 to 5, the learning-based 3D model creation apparatus may create a 3D model as follows.

Multi-view images may be received. Multi-view feature images may be generated by applying supervised learning to the received multi-view images at step S110. A 3D mesh model may be created using a point cloud corresponding to the multi-view feature images and the feature images representing internal shape information at step S120. Thereafter, a texture map may be generated by projecting the 3D mesh model into the received three viewpoint images at step S130. A 3D model may be finally created using the texture map at step S140.

In an embodiment, the generation of the multi-view feature images may include the reception of the three viewpoint images, corresponding to a front view, a side view, and a rear view, and the collection of character model data for learning.

In an embodiment, the generation of multi-view feature images may further include the generation of multi-view images performed by projecting a character model in respective camera viewpoints.

In an embodiment, supervised learning may be separately performed by dividing cameras into a global camera group and local camera groups.

In an embodiment, the learning parameters of the global camera group may be different from the learning parameters of the local camera groups.

In an embodiment, the creation of the 3D mesh model may include the representation of the multi-view feature images by a point cloud in a 3D space through a multi-view image-based 3D reconstruction algorithm, and the creation of the 3D mesh model by correcting the point cloud using result values obtained through an X-Ray Network (X-Ray Net).

In an embodiment, the X-ray Net may generate the feature image representing the internal shape information of the reconstruction target object by receiving, as an input, a feature image in a specific viewpoint, among the multi-view feature images.

In an embodiment, the generation of the texture map may further include acquiring pieces of texture information for respective polygons in association with the three-view images, and generating colors for areas which cannot be acquired from the three-view images by performing color transfer on the acquired texture information.

In an embodiment, some or all of steps and/or operations may be implemented or performed using instructions, a program, and an interactive data structure, which are stored in one or more non-transitory computer-readable media, and one or more processors for driving clients and/or a server. The one or more non-transitory computer-readable media may be, for example, software, firmware, hardware and/or combinations thereof. Also, the function of "module" discussed in the present specification may be implemented using software, firmware, hardware and/or any combinations thereof.

The one or more non-transitory computer-readable media and/or means for implementing/executing operations/steps/modules in embodiments of the present invention may include, but are not limited to, application-specific integrated circuits (ASICs), standard integrated circuits, a controller for executing suitable commands, such as microcontrollers, and/or an embedded controller, field-programmable gate arrays (FPGAs), complex programmable logic devices (CPLDs), or the likes.

The learning-based 3D model creation apparatus and method according to the embodiment of the present invention may arrange multi-view cameras that are capable of reconstructing details, such as the eyes, nose, and mouth levels of a face, even at an input image having low resolution, may configure camera parameters, and may reconstruct a learning network and a point cloud.

Figure 6:
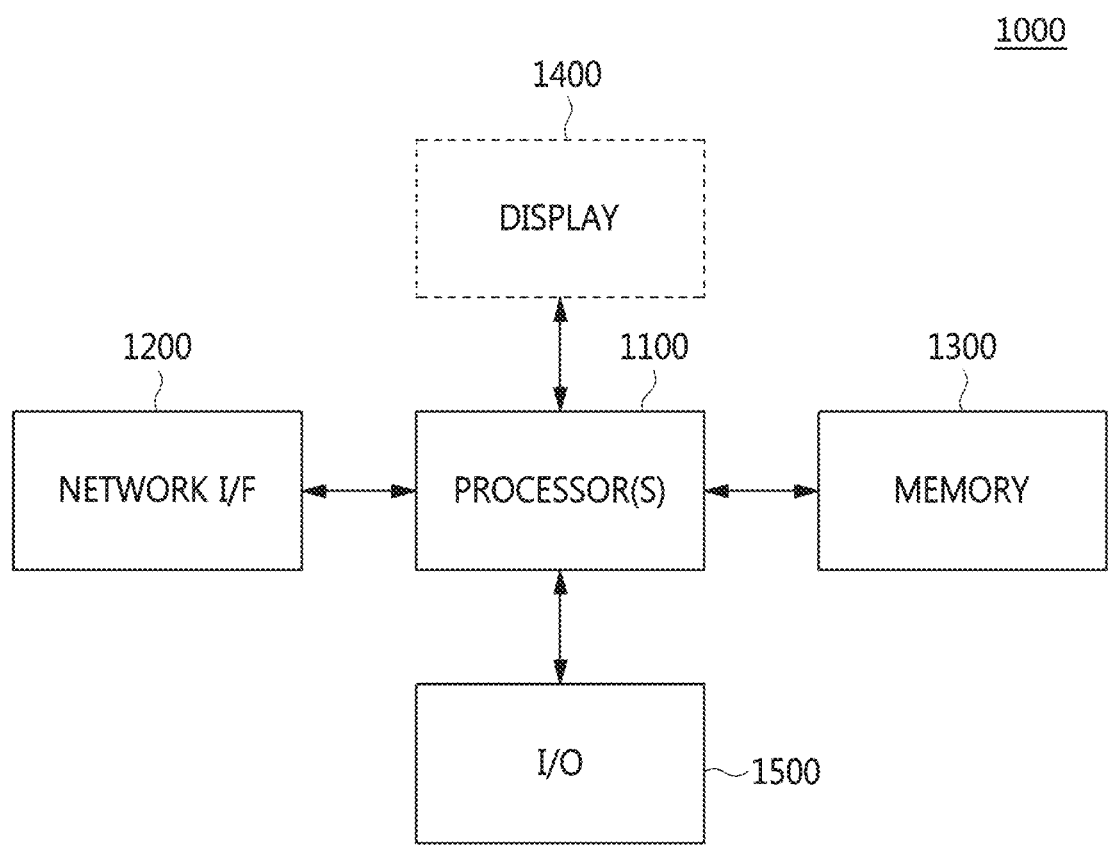
FIG. 6 is a diagram exemplarily illustrating a learning-based 3D model creation apparatus according to an embodiment of the present invention.

FIG. 6 is a diagram exemplarily illustrating a learning-based 3D model creation apparatus 1000 according to an embodiment of the present invention. Referring to FIG. 6, the learning-based 3D model creation apparatus 1000 may include at least one processor 1100, a network interface (I/F) 1200, memory 1300, a display 1400, and an input/output (I/O) device 1500.

Although not illustrated in the drawing, the learning-based 3D model creation apparatus 1000 may include a sensor. The sensor may include an image sensor, a microphone, etc. for sensing image data, voice data, etc. so as to recognize an object. The sensor may sense an image or the like using a well-known scheme (e.g., a scheme for converting an optical image into an electrical image or the like). The output of the sensor may be output to the processor 1100 or the memory 1300.

The processor 1100 may include at least one device described above with reference to FIGS. 1 to 5, or may be implemented using at least one method described above with reference to FIGS. 1 to 5. The processor 1100 may generate multi-view feature images using supervised learning, and may create a 3D mesh model using a point cloud corresponding to the multi-view feature images and feature images representing internal shape information, may generate a texture map by projecting the 3D mesh model into input three viewpoint images, and may create a 3D model using the texture map.

The processor 1100 may execute a program and control an electronic system. The electronic system may be connected to an external device (e.g., a personal computer or a network) through the I/O device 1500, and may exchange data with the external device. The electronic system may include various electronic systems, for example, a mobile device such as a mobile phone, a smart phone, a Personal Digital Assistance (PDA), a tablet computer, or a laptop computer, a computing device such as a personal computer, a tablet computer, or a Netbook, or an electronic appliance such as a television (TV), a smart television, or a security device for gate control.

The network interface 1200 may be implemented to perform communication with an external network in various wired/wireless manners.

The memory 1300 may include computer-readable instructions. The processor 1100 may perform the above-described operations when the instructions stored in the memory 1300 are executed on the processor 1100. The memory 1300 may be volatile memory or nonvolatile memory.

The memory 1300 may include a storage device to store data of a user. The storage device may be an Embedded Multimedia Card (eMMC), a Solid-State Drive (SSD), universal flash storage (UFS), or the like. The storage device may include at least one nonvolatile memory device. The nonvolatile memory device may be any one of NAND flash memory, Vertical NAND (VNAND) flash memory, NOR flash memory, Resistive Random Access Memory (RRAM), Phase-Change Memory (PRAM), Magnetoresistive Random Access Memory (MRAM), Ferroelectric Random Access Memory (FRAM), and Spin Transfer Torque Random Access Memory (STT-RAM).

The above-described embodiments may be implemented using hardware components, software components, and/or combinations of hardware components and software components. For example, the apparatus (device), method, and components described above in the embodiments may be implemented using one or more general-purpose computers or special-purpose computers, as in the case of a processor, a controller, an Arithmetic Logic Unit (ALU), a digital signal processor, a microcomputer, a Field-Programmable Gate Array (FPGA), a Programmable Logic Unit (PLU), a microprocessor, or any other device capable of executing and responding to instructions. A processing device may execute an Operating System (OS) and one or more software applications running on the OS.

Further, the processing device may access, store, handle, process and generate data in response to the execution of software. For convenience of understanding, there is the case where a single processing device is described as being used, but those skilled in the art to which the corresponding technical fields pertain will understand that the processing device may include multiple processing elements and/or multiple types of processing elements. For example, the processing device may include multiple processors or a single processor and a single controller. Furthermore, the processing device may include an additional processing configuration such as one including parallel processors.

The software may include a computer program, code, an instruction, or a combination of one or more thereof, and may configure the processing device so that the processing device is operated in a desired manner, or may independently or collectively issue commands to the processing device. The software and/or data may be interpreted by the processing device or may be permanently or temporarily embodied in a certain type of machine, a component, a physical device, virtual equipment, a computer-storage medium or device, or a signal wave to be transmitted so as to provide commands or data to the processing device. The software may be distributed to computer systems connected over a network, and may also be stored or executed in a distributed manner. The software and data may be stored in one or more computer-readable storage media.

The method according to the embodiment may be implemented in program instructions that can be executed through various types of computer means, and may be recorded in a computer-readable storage medium. The computer-readable storage medium may include a program instruction, a data file, a data structure, etc. alone or in combination. The program instruction recorded in the medium may be designed and configured especially for embodiments or may be known to and used by those skilled in computer software fields.

Examples of the computer-readable storage medium may include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

Meanwhile, the 3D model creation apparatus according to the present invention may acquire views corresponding to various viewpoints through the array of virtual multi-view cameras for a 3D graphic object. However, the present invention is not necessarily limited to virtual multi-view cameras. The present invention may also acquire views corresponding to various viewpoints through actual multi-view cameras.

Figure 7:
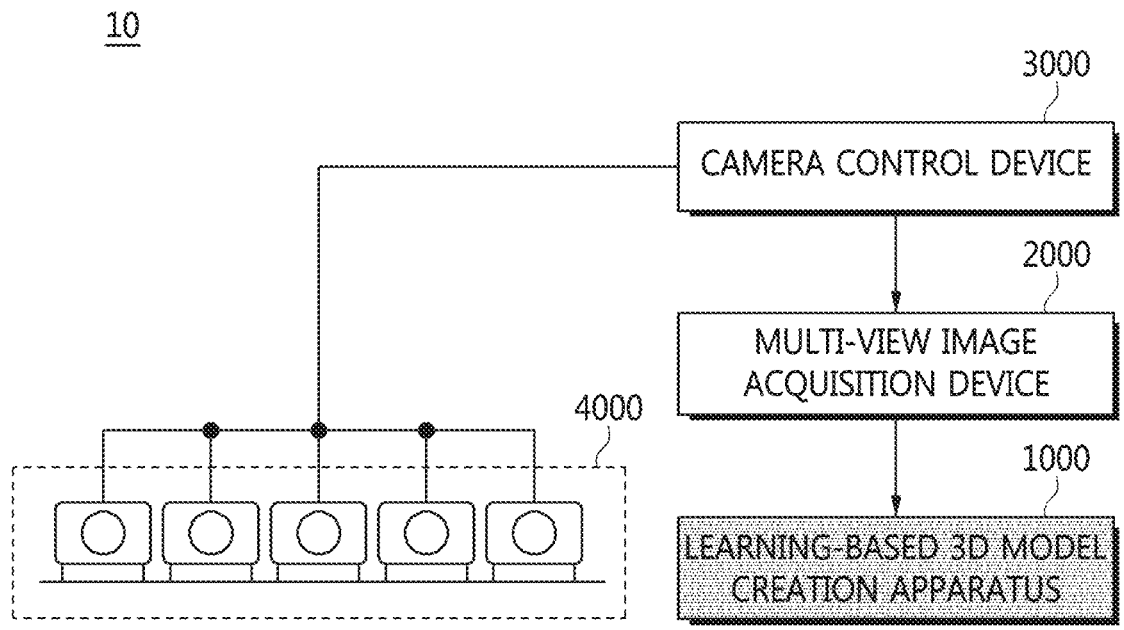
FIG. 7 is a diagram exemplarily illustrating a 3D model creation system according to an embodiment of the present invention.

FIG. 7 is a diagram exemplarily illustrating a 3D model creation system 10 according to an embodiment of the present invention. Referring to FIG. 7, the 3D model creation system 10 may include a learning-based 3D model creation apparatus 1000, a multi-view image acquisition device 2000, a camera control device 3000, and a multi-view camera 4000.

The learning-based 3D model creation apparatus 1000 may be implemented to create a 3D model based on learning for multi-view images. The learning-based 3D model creation apparatus 1000 may generate multi-view feature images using supervised learning, create a 3D mesh model using a point cloud corresponding to the multi-view feature images and feature images representing internal shape information, and may generate a texture map by projecting the 3D mesh model into input three viewpoint images and create a 3D model using the texture map.

The multi-view image acquisition device 2000 may store/manage the acquired multi-view images. The camera control device 3000 may be implemented to perform parameter control and synchronization of the multi-view camera 4000.

The present invention provides technology that can remarkably save time and reduce costs by automatically replacing a 3D model creation pipeline, which is conventionally conducted based on existing manual tasks ranging from the production of an original picture and 3D modeling to texturing, and is advantageous in that it can overcome technical and financial problems of companies that require labor and time, such as in gaming and animation industries. That is, in accordance with the configuration of the present invention, there are provided a learning-based 3D model creation apparatus and method, which receive only several images corresponding to an original picture of a front-view image or original pictures of a front-view image and a side-view image as inputs, and which create a 3D model very similar to the original picture enabling animation. Therefore, there are advantages in that even internal shapes, which are a limitation of existing 3D reconstruction technologies, may be reconstructed and generated, so that results at a level similar to detailed modeling using a manual task may be output, thus greatly reducing the amount of labor, such as junior and senior designers, costs, and time that is required.

The learning-based 3D model creation apparatus and method according to the embodiment of the present invention may generate full 3D model including external (outer) shape/internal shape/texture of the 3D model automatically.

The learning-based 3D model creation apparatus and method according to the embodiment of the present invention may generate the multi-view feature image using three input images. Especially, the normal and depth images may be used for generating the external shape and the x-ray image may be used for generating the internal shape.

The learning-based 3D model creation apparatus and method according to the embodiment of the present invention may generate the point cloud in the 3D space based on the multi-view feature image.

The learning-based 3D model creation apparatus and method according to the embodiment of the present invention may generate the internal shape (such as body parts covered by clothing) of the 3D model by using the x-ray feature map.

The learning-based 3D model creation apparatus and method according to the embodiments of the present invention may automatically replace a 3D model creation pipeline, which was conventionally conducted based on existing manual tasks ranging from the production of an original picture and 3D modeling to texturing, thus remarkably saving time and reducing costs. As a result, the present invention may overcome technical and financial problems of companies that require labor and time, such as in the gaming and animation industries.

The learning-based 3D model creation apparatus and method according to the embodiment of the present invention may receive only several images, corresponding to an original picture of a front-view image or original pictures of a front-view image and a side-view image, as inputs, and may create a 3D model similar to the original picture enabling animation, thus obtaining advantages in that even internal shapes, which is a limitation facing existing 3D reconstruction technologies, may be reconstructed and generated, and so that results at a level similar to detailed modeling using a manual task may be output, thus greatly reducing labor such as junior and senior designers, costs, and time that is required.

Meanwhile, the descriptions of the present invention merely provide detailed embodiments for practicing the invention. The present invention may include not only means that are detailed and actually usable, but also the technical spirit, which is an abstract and conceptual idea that may be available as technology in the future.

What is claimed is:

1. A method for operating a learning-based three-dimensional (3D) model creation apparatus, comprising:
generating multi-view feature images using multi-view image generation networks;
generating internal feature images using an internal image generation network; and
creating a 3D model based on the multi-view feature images and the internal feature images,
wherein the internal image generation network generates the internal feature images by receiving, as an input, feature images satisfying predetermined conditions, among the multi-view feature images,
wherein the internal feature images represent internal shape information of the 3D model, and
wherein the internal image generation network is learned using multi-view images that are generated by projecting an internal shape 3D model into global camera group viewpoints.

2. The method of claim 1, wherein the multi-view image generation networks include a global network corresponding to a global camera group and a local network corresponding to a local camera group.

3. The method of claim 2, wherein the multi-view image generation networks are learned using multi-view images generated by projecting a training 3D model into each camera group viewpoint.

4. The method of claim 2, wherein the global network generates multi-view feature images corresponding to entire shape of the 3D model, and the local network generates multi-view feature images corresponding to detailed shape of the 3D model.

5. The method of claim 2, wherein the local camera group corresponds to a dense allocation and the global camera group corresponds to a sparse allocation.

6. The method of claim 2, wherein creating a 3D model comprises:
creating a 3D mesh model based on the multi-view feature images and the internal feature images;
generating a texture map by projecting the 3D mesh model; and
creating the 3D model using the 3D mesh model and the texture map.

7. The method of claim 6, wherein creating a 3D mesh model comprises creating the 3D mesh model based on a global point cloud corresponding to the global network, a local point cloud corresponding to the local network, and an internal point cloud corresponding to the internal image generation network.

8. The method of claim 1, wherein the internal shape 3D model corresponds to a training 3D model of which an outer layer is removed.

9. A learning-based three-dimensional (3D) model creation apparatus, comprising:
at least one processor; and
a memory for storing at least one instruction executed by the at least one processor,
wherein the at least one instruction is configured to:
generating multi-view feature images using multi-view image generation networks,
generating internal feature images using an internal image generation network, and
creating a 3D model based on the multi-view feature images and the internal feature images, wherein the internal image generation network generates the internal feature images by receiving, as an input, feature images satisfying predetermined conditions, among the multi-view feature images, wherein the internal feature images represent internal shape information of the 3D model, and wherein the internal image generation network is learned using multi-view images that are generated by projecting an internal shape 3D model into global camera group viewpoints.

* * * * *